United States Patent [19]

Gehman et al.

[11] Patent Number: 4,627,633
[45] Date of Patent: Dec. 9, 1986

[54] TRAILER HITCH UNCOUPLE DETECTING AND SIGNALING APPARATUS

[75] Inventors: Roland P. Gehman, Stevens; Raymond G. Martin, East Earl, both of Pa.

[73] Assignee: MGS, Inc., Denver, Pa.

[21] Appl. No.: 840,304

[22] Filed: Mar. 17, 1986

[51] Int. Cl.$^4$ ............................................. B60D 1/12
[52] U.S. Cl. .................................... 280/432; 280/507; 280/511; 340/52 R
[58] Field of Search .............. 280/432, 507, 511, 477; 340/52 R, 904

[56] References Cited

U.S. PATENT DOCUMENTS

| | | | |
|---|---|---|---|
| 2,797,406 | 6/1957 | Tanis et al. | 340/282 |
| 3,047,839 | 7/1962 | Brown et al. | 340/52 |
| 3,479,057 | 11/1969 | Miller | 280/511 |
| 3,710,370 | 1/1973 | Quilici et al. | 340/275 |
| 3,792,563 | 11/1974 | Ellis et al. | 340/52 R |

*Primary Examiner*—John J. Love
*Assistant Examiner*—Donn McGiehan
*Attorney, Agent, or Firm*—Michael R. Swartz; John R. Flanagan

[57] ABSTRACT

A hitch uncouple detecting and signaling apparatus, being applied to a trailer hitch ball member, includes a plunger rod reciprocally mounted vertically through the ball member. The rod is longer than the ball member, allowing the rod to extend either above or below opposite upper and lower ends of the ball member. The rod is composed of electrically nonconductive material capable of being trimmed to a length which will exceed the ball member height at least by a desired amount. An electrical circuit adapted for connection to a source of electrical power includes an operator signaling device and a pair of contacts. One contact is carried by a lower end of the rod and the other contact is defined on the lower end of the ball member, which preferably is composed of electrically conductive material. A resiliently stretchable band interconnects the rod and the ball member so as to bias the rod upwardly with its upper end extending above the ball member and the one contact electrically engaged with the other contact causing activation of the operator signaling device. Upon seating of the trailer hitch socket member on the ball member, the stretchable band yields to permit the rod to move downwardly, displacing the one contact below the other contact and deactivating the operator signaling device. However, the signaling device will reactivate whenever the socket member uncouples from the ball member sufficiently to allow the rod to return upwardly and the contacts to again electrically engage one another.

17 Claims, 2 Drawing Figures

TRAILER HITCH UNCOUPLE DETECTING AND SIGNALING APPARATUS

BACKGROUND OF THE INVENTION

1. Field of the Invention

The present invention relates generally to a trailer hitch for providing safe and secure coupling of a trailer to a towing vehicle and, more particularly, is concerned with apparatus associated with the hitch for detecting when the components of the hitch have started to uncouple and for signaling the operator of the same.

2. Background of the Prior Art

A conventional trailer hitch is composed of two basic components, a ball member connected on the rear end of an attachment plate mounted to the towing vehicle and a socket member connected to the forward end of the towed trailer. In addition to the ball and socket members, a latch mechanism is ordinarily mounted adjacent to the socket member and is actuatable, once the socket member has been placed or seated on the ball member, to couple the two together. Typically, the socket member includes a part movable by the latch mechanism to a locking position which prevents uncoupling of the socket member from the ball member.

While the socket member is thusly "locked" on the ball member, the coupling must permit lateral pivoting of the socket and ball members relative to one another through a wide angle for accommodating turning of the towing vehicle relative to the trailer. Also, the coupling must permit limited vertical pivoting of the socket and ball members relative to one another for accommodating uneven terrain. In short, although a firm and reliable connection must be maintained between the members, the two members must be permitted to rotate and pivot freely.

Trailer hitch components of the type described are inherently subject to abuse, corrosion and wear due to various factors, such as highway jarring and vibration and exposure to weather, which can result in defective operation of the latching mechanism and uncoupling during use. Also, the operator could fail to properly actuate the latching mechanism to securely couple the socket member to the ball member or could forget to do so altogether. The consequences of the trailer uncoupling from the vehicle during towing on the highway are oftentimes catastrophic in terms of personal injury to others on the highway as well as the damage to the trailer. The operator of the towing vehicle is normally unaware that the trailer hitch components are not securely coupled or are starting to uncouple until the trailer actually breaks loose of the towing vehicle.

Various safety devices have been proposed in the prior art to sense or detect uncoupling of the trailer hitch components and alert the towing vehicle operator. Representative of the prior art are the devices disclosed in U.S. patents to Brown et al (U.S. Pat. No. 3,047,839), Miller (U.S. Pat. No. 3,479,057), Ellis et al (U.S. Pat. No. 3,792,432) and Quilici et al (U.S. Pat. No. 3,710,370). While many of these devices would appear to operate reasonably well and generally achieve their objectives under the range of operating conditions for which they were designed, most seem to embody shortcomings which make them less than an optimum safety device. Some devices have components which are exposed to inadvertent damaging contact during guiding and hitching of the socket member to the ball member. Other devices deploy their components where they are subject to corrosion and the accumulation of dirt and other foreign matter which make them susceptible to malfunction. Still other devices, being composed of a multiplicity of parts, are complex and costly to manufacture. Further, each time the socket member is hitched to the ball member, some of the devices require several setup steps in addition to the step of latching the socket member to the ball member. In other words, activation of the safety device is not automatic with coupling of the hitch members. Finally, some devices will only work with a socket member within a limited range of structural configurations and therefore do not have universal application to all hitch configurations.

Consequently, a need still exists for a safety device which is relatively inexpensive, simple in construction and operation, adaptable for use on a variety of hitch socket configuration and not deployed in a location where it is apted to become damaged.

SUMMARY OF THE INVENTION

The present invention provides hitch uncouple detecting and signaling apparatus designed to satisfy the aforementioned needs. The apparatus of the present invention incorporates several features which cooperate to provide a simple, inexpensive mechanism which is activated automatically by seating the socket member of the hitch on the ball member and universally adapted to work with any socket member configuration. In addition, the exposed components of the apparatus are durable and unlikely to malfunction due to corrosion or accumulation of foreign matter. Also, the components are not deployed where they are likely to be struck inadvertently during the hitching operation. In essence, a hallmark of the hitch uncouple detecting and signaling apparatus of the present invention is the simplicity which underlies its construction, set up and operation.

Accordingly, the present invention is directed to a hitch uncouple detecting and signaling apparatus for use with a trailer hitch ball member. The apparatus comprises: (a) a plunger rod reciprocally mountable through the ball member and being longer than the height of the ball member such that one or the other opposite ends of the rod will extend beyond one or the other opposite ends of the ball member; (b) an electrical circuit adapted for connection to a source of electrical power and including operator signaling means and a pair of contacts, one contact being carried by one end of the rod and the other contact being defined on one end of the ball member; and (c) flexible means interconnectible to the rod and the ball member so as to bias the rod to an extended position wherein its other end extends beyond the other end of the ball member and the one contact on its one end is disposed in electrical engagement with the other contact on the one end of the ball member causing activation of the signaling means. The flexible means is yieldable so as to permit movement of the rod toward and retention thereof at a retracted position upon engage and movement of its other end due to seating of the trailer hitch socket member on the other end of the ball member. Such movement of the rod causes displacement and electrical disengagement of the one contact from the other and deactivation of the signaling means. However, the signaling means is reactivated whenever the hitch socket member uncouples from the ball member sufficiently to allow movement of the rod to its extended position which causes electrical engagement of the electrical contacts.

More particularly, the ball member is composed of electrically conductive material, while the plunger rod is composed of electrically nonconductive material. Further, the rod is preferably composed of a material capable of being trimmed to shorten the rod to a desired length which will exceed the height of the ball member at least by a desired amount. Also, the flexible means is in the form of an endless band of resiliently stretchible material attached to the ball member and stretched away from it and about the one end of the rod.

Still further, the one end of the rod is in the form of an enlarged head having a larger diametric size than the remainder of the rod, and the one contact is in the form of an annular ring of electrically conductive material which surrounds and seats on the head of the rod. On the other hand, the other contact is in the form of a shank on the ball member by which the ball member is mountable on a towing vehicle attachment plate. The stretchible band has an opening defined therein for receiving the ball member shank with portions of the band surrounding the opening capable of being clamped between the ball member and the attachment plate on which the ball member is mountable.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 2:
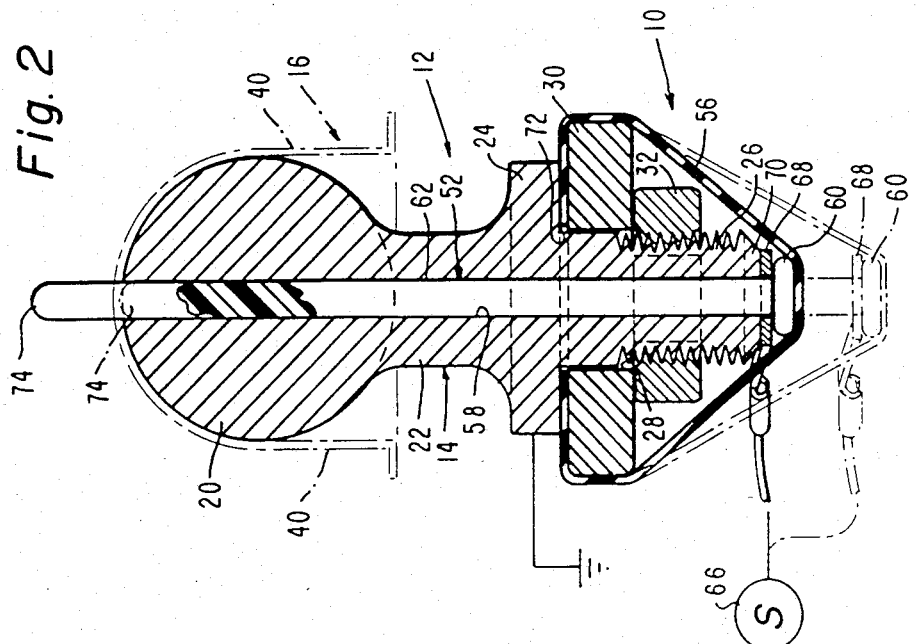
FIG. 2 is an enlarged sectional view of the hitch uncouple detecting and signaling apparatus as taken along line 2—2 of FIG. 1.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring now to the drawings, there is shown the preferred embodiment of the hitch uncouple detecting and signaling apparatus of the present invention, being indicated generally by the numeral 10, applied to a conventional trailer hitch 12. The trailer hitch 12 includes a ball member 14, a socket member 16 and a latching mechanism 18.

The ball member 14, being fabricated from metallic electrically conductive material, has an upper ball portion 20 which merges with a middle pedastal 22 having an annular flange 24 which, in turn, merges with a lower elongated externally threaded shank 26. The shank 26 is sized to fit through a hole 28 formed in the rear end of an attachment plate 30 for positioning the ball member 14 in an upright position thereon with its flange 24 seated on the upper surface of the plate 30. A nut 32 is threaded on the lower end of the shank 26 to securely mount the ball member 14 on the attachment plate 30. The attachment plate 30 in turn, is connected to the rear of a towing vehicle (not shown).

Figure 1:
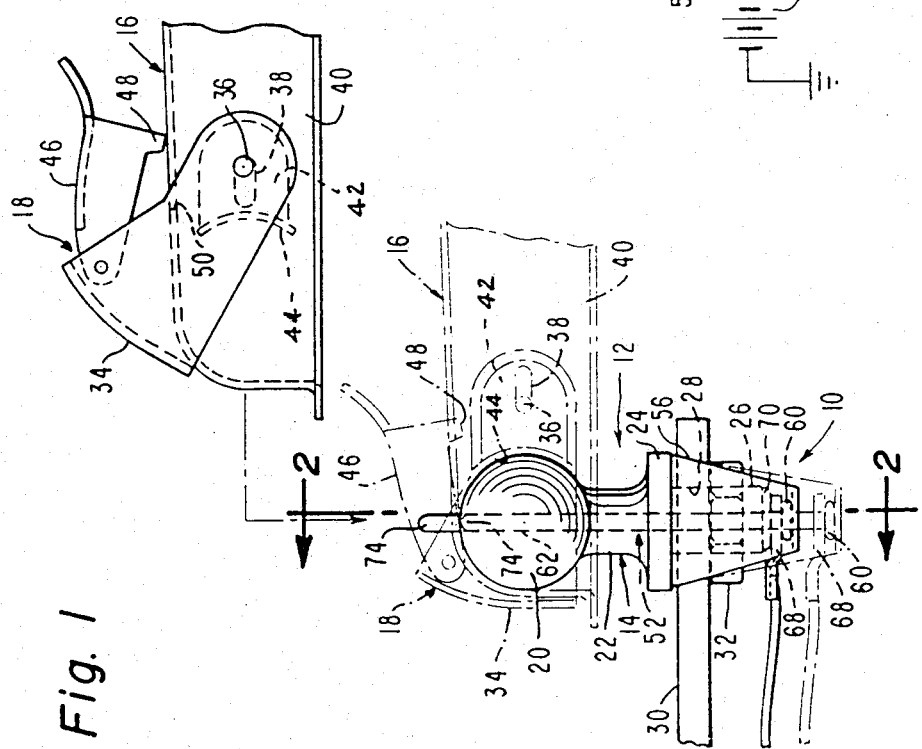
FIG. 1 is a side elevational view of the ball member, socket member and latching mechanism of a trailer hitch and of the hitch uncouple detecting and signaling apparatus of the present invention mounted to the ball member of the hitch, with the socket member and latching mechanism being shown in solid line form prior to seating and latching on the ball member and in dashed line form after seating and latching thereon, and with the extended and retracted positions of a movable plunger rod of the apparatus mounted centrally through the ball member being shown in respective solid and dashed line forms.

The socket member 16 is adapted to fit over and seat on the upper ball portion 20 of the ball member 14, as seen in dashed line form in FIGS. 1 and 2. After being seated on the ball member 14, the socket member 16 can be securely coupled thereon by actuation of the latching mechanism 18 which is mounted rearwardly of the forward end of the socket member. The latching mechanism 18 which operates in a well-known member has a lever 34 disposed along the exterior of the socket member 16 and pivotally coupled to opposite ends of a pin 36 extending through a pair of slots 38 defined in opposite sides 40 of the socket member 16. The pin 36 is attached to a rearwardly biased slider 42 disposed along the interior of the socket member 16. The slider 42 has a forward surface 44 configured to conform with the surface on the rear side of the upper ball portion 20 of the ball member 14.

When the lever 34 is pivoted from its upper unlatching position (solid line form in FIG. 1) to its lower latching position (dashed line form in FIG. 1), the slider 42 is forced forwardly, disposing its surface 44 closely adjacent to the rear side of the upper ball portion 20 of the ball member 14 so as to capture and retain the ball portion 20 within the forward end of the socket member 16. To lock the lever 34 in its lowered position, a latch finger 46 of the latching mechanism 18, being pivotally mounted to the lever 34, is pivoted downwardly toward the socket member 16 to the position depicted in dashed line form in FIG. 1 wherein lower rear locking tabs 48 on the finger 46 (only one being seen in FIG. 1) project through openings 50 in the top of the socket member.

The apparatus 10 of the present invention is operatively associated with the ball member 14 of the hitch 12 for detecting uncoupling of the socket member 16 therefrom and generating a signal which will alert the operator of the towing vehicle to take appropriate emergency action to avoid the towed trailer from uncoupling completely from the towing vehicle. Basically, the apparatus 10 is composed of a plunger rod 52, an electrical circuit 54 and resilient flexible means 56 for biasing the rod.

The elongated plunger rod 52 of the apparatus 10 is mounted for reciprocable movement through a central or axial bore 58 formed vertically in the ball member 14. The bore 58 extends the complete height of the ball member 14, opening at the upper end of its ball portion 20 and at the lower end of its shank 26. The plunger rod 52 is longer than the height of the ball member 14 such that the lower or upper ends of the rod will extend beyond the lower or upper ends of the ball member. The rod 52 is composed of electrically nonconductive material, preferably, a plastic, capable of being trimmed to shorten the rod to a desired length which will exceed the height of the ball member 14 by at least a desired amount to ensure that the rod will work properly with the socket member 16, whatever its configuration or physical condition happens to be.

The lower end of the plunger rod 52 is in the form of an enlarged head 60 and the remainder of the rod is in the form of an elongated stem 62 having the head 60 attached thereon. The stem 62 has a generally constant diametric size adapting it to fit through the central bore 58 of the ball member 14 with just enough clearance to allow it to slidably move freely relative to the ball member. The rod head 60 has a diametric size larger than that of the stem 62 and the bore 58 also. Therefore, the rod 52 has to be inserted into the bore 58 from the lower end of the ball member 14 to assemble the rod to the ball member.

The electrical circuit 54 of the apparatus 10, being schematically represented in FIG. 2, is connected to a source of electrical power, such as the cigarette lighter or the battery 64 of the towing vehicle. The circuit 54 includes an operator signaling device 66, such as a light or horn on the towing vehicle, and a pair of contacts 68,70. One contact 68 in the form of an annular plate or ring of electrically conductive material is carried by the lower end of the rod 52. Specifically, the contact ring 68 surrounds the rod 52 and is seated on the enlarged head 60 of the rod. The other contact 70 is defined on the lower end of ball member 14. Specifically, the other contact 70 is formed by the bottom of the threaded shank 26 of the ball member 14 which extends below the nut 32. The power source, such as the battery 64, the operator signaling device 66, and the contacts 68,70 of the circuit 54 are all connected in series. Since the battery 64 and the ball member 14 via the attachment plate 30 are both grounded to the vehicle chassis, the signaling device 66 is activated when the contacts 68,70 are electrically engaged with one another.

The resiliently flexible means 56 of the apparatus 10 is preferably in the form of an endless band of stretchible material, such as rubber, although another suitable device such as a spring could also be used. The stretchible band 56 has an opening 72 defined therein for receiving the shank 26 of the ball member 14 after the band has been positioned on the rear end of the alignment plate 30 and its opening 72 aligned with the hole 28 in the plate but before the shank is assembled to the plate. Then when the ball member 14 is securely mounted to the attachment plate 30, portions of the band 56 surrounding its opening 72 are clamped between the ball member flange 24 and the plate 30. The band 56 is then stretched downwardly about the enlarged head 60 of the rod 52, interconnecting the rod 52 and the ball member 14. The stretched condition of the band 56 biases the rod to an extended position wherein its upper end 74 protrudes or extends upwardly beyond the upper end of the ball member 14, as seen in solid line form in FIGS. 1 and 2. In such position, the one contact 68 of the circuit 54 seated on the head 60 of the rod 52 is disposed in electrical engagement with the other contact 70, i.e., the lower end of the shank 26. As mentioned earlier, electrical engagement of the contacts 68,70 causes activation of the signaling device 66. It will be understood that the movable rod 52 and the contact 68, in effect, provide a movable switch in the circuit 54.

The band 56 will yield or stretch some more to permit movement of the rod 52 toward a retracted position, shown in dashed line form in FIGS. 1 and 2, upon depression of its upper end 74 due to seating of socket member 16 on the ball member 14. Such downward movement of the rod 52 causes displacement and electrical disengagement of the one contact 68 downwardly from the other contact 70 and thereby deactivation of the signaling device 66. It will be understood, therefore, that the signaling device 66 is activated whenever the trailer hitch socket member 16 is uncoupled from the ball member 14 sufficiently to allow movement of the rod 52 to its extended position, whereas it is deactivated whenever the socket member 16 is coupled to the ball member 14 sufficiently to retain the rod 52 away from its extended position.

It is thought that the hitch uncouple detecting and signaling apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. A hitch uncouple detecting and signaling apparatus for use with a ball member of a trailer hitch, comprising:
   (a) a plunger rod reciprocally mountable through said ball member and being longer than the height of said ball member such that one or the other opposite ends of said rod will extend beyond one or the other opposite ends of said ball member;
   (b) an electrical circuit adapted for connection to a source of electrical power and including operator signaling means and a pair of contacts, one contact being carried by one end of said rod and the other contact being defined on one end of said ball member; and
   (c) flexible means interconnectible to said rod and said ball member so as to bias said rod to an extended position wherein its other end extends beyond the other end of said ball member and said one contact on its one end is disposed in electrical engagement with said other contact on said one end of said ball member causing activation of said signaling means, said flexible means being yieldable so as to permit movement of said rod toward and retention thereof at a retracted position upon engagement and movement of its other end due to seating of a trailer hitch socket member on said other end of said ball member, said movement of said rod causing displacement and electrical disengagement of said one contact from said other contact and deactivation of said signaling means, whereby said signaling means is activated whenever the trailer hitch socket member is uncoupled from said ball member sufficiently to allow movement of said rod to its extended position, whereas said signaling means is deactivated whenever said socket member is coupled to said ball member sufficiently to retain said rod away from its extended position.

2. The apparatus as recited in claim 1, wherein said ball member is composed of electrically conductive material.

3. The apparatus as recited in claim 1, wherein said plunger rod is composed of electrically nonconductive material.

4. The apparatus as recited in claim 1, wherein said plunger rod is composed of a material capable of being trimmed to shorten said rod to a desired length which will exceed the height of said ball member by at least a desired amount.

5. The apparatus as recited in claim 1, wherein said flexible means is in the form of a band of resiliently stretchible material attached to said ball member and stretched away therefrom and about said one end of said rod.

6. The apparatus as recited in claim 1, wherein said one end of said rod is in the form of an enlarged head and the remainder of said rod is in the form of an elongated stem having said head attached thereon, said head being of a larger diametric size than said stem of said rod.

7. The apparatus as recited in claim 6, wherein said one contact is in the form of an annular ring of electrically conductive material surrounding and seated on said enlarged head of said rod.

8. The apparatus as recited in claim 1, wherein said other contact is in the form of a shank on said ball member by which said ball member is mountable on a towing vehicle attachment plate.

9. The apparatus as recited in claim 8, wherein said flexible means is in the form of a band of resiliently stretchable material having an opening defined therein for receiving said ball member shank with portions of said band surrounding said opening capable of being attached to said ball member and said attachment plate on which said ball member is mountable.

10. A hitch uncouple detecting and signaling apparatus for use with a ball member of a trailer hitch, comprising:
   (a) a plunger rod reciprocally mountable through a central bore formed vertically in said ball member and being longer than the height of said ball member such that the lower or upper ends of said rod will extend beyond the lower or upper ends of said ball member;
   (b) an electrical circuit adapted for connection to a source of electrical power and including operator signaling means and a pair of contacts, one contact being carried by said lower end of said rod and the other contact being defined on said lower end of said ball member; and
   (c) flexible means interconnectible to said rod and said ball member so as to bias said rod to an upwardly extended position wherein its upper end extends upwardly beyond the upper end of said ball member and said one contact on its lower end is disposed in electrical engagement with said other contact on said lower end of said ball member causing activation of said signaling means, said flexible means being yieldable so as to permit movement of said rod downwardly toward and retention thereof at a retracted position upon depression of its upper end due to seating of a trailer hitch socket member on said upper end of said ball member, said downward movement of said rod causing displacement and electrical disengagement of said one contact downwardly from said other contact and deactivation of said signaling means, whereby said signaling means is activated whenever the trailer hitch socket member is uncoupled from said ball member sufficiently to allow movement of said rod upwardly to its extended position, whereas said signaling means is deactivated whenever said socket member is coupled to said ball member sufficiently to retain said rod away from its extended position.

11. The apparatus as recited in claim 10, wherein:
said ball member is composed of electrically conductive material; and
said plunger rod is composed of electrically nonconductive material.

12. The apparatus as recited in claim 10, wherein said plunger rod is composed of a plastic material capable of being trimmed to shorten said rod to a desired length which will exceed the height of said ball member by at least a desired amount.

13. The apparatus as recited in claim 10, wherein:
said lower end of said rod is in the form of an enlarged head and the remainder of said rod is in the form of an elongated stem having said head attached thereon, said head being of a larger diametric size than said stem of said rod;
said one contact is in the form of an annular ring of electrically conductive material surrounding and seated on said enlarged head of said rod;
said other contact is in the form of a threaded shank defined on said lower end of said ball member by which said ball member is mountable on a towing vehicle attachment plate; and
said resiliently flexible means is in the form of a band of stretchable material having an opening defined therein for receiving said shank of said ball member with portions of said band surrounding said opening capable of being attached to said ball member and said attachment plate on which said ball member is mountable, said band of material being stretched to extend about said enlarged head of said rod at another portion thereof opposite said opening defined in said band.

14. In combination with a ball member of a trailer hitch mountable to a towing vehicle and for receiving a socket member mounted to a towed trailer, said ball member having opposite upper and lower ends, a hitch uncouple detecting and signaling apparatus comprising:
   (a) a plunger rod mounted for reciprocable movement through a central bore formed vertically in said ball member and being longer than the height of said ball member such that the lower or upper ends of said rod will extend beyond the lower or upper ends of said ball member;
   (b) an electrical circuit adapted for connection to a source of electrical power and including operator signaling means and a pair of contacts, one contact being carried by said lower end of said rod and the other contact being defined on said lower end of said ball member; and
   (c) flexible means interconnecting said rod and said ball member so as to bias said rod to an upwardly extended position wherein its upper end extends upwardly beyond the upper end of said ball member and said one contact on its lower end is disposed in electrical engagement with said other contact on said lower end of said ball member causing activation of said signaling means, said flexible means being yieldable so as to permit movement of said rod downwardly toward and retention thereof at a retracted position upon depression of its upper end due to seating of a trailer hitch socket member on said upper end of said ball member, said downward movement of said rod causing displacement and electrical disengagement of said one contact downwardly from said other contact and deactivation of said signaling means, whereby said signaling means is activated whenever the trailer hitch socket member is uncoupled from said ball member sufficiently to allow movement of said rod upwardly to its extended position, whereas said signaling means is deactivated whenever said socket member is coupled to said ball member sufficiently to retain said rod away from its extended position.

15. The apparatus as recited in claim 14, wherein:
said ball member is composed of electrically conductive material; and
said plunger rod is composed of electrically nonconductive material.

16. The apparatus as recited in claim 14, wherein said plunger rod is composed of a plastic material capable of being trimmed to shorten said rod to a desired length which will exceed the height of said ball member by at least a desired amount.

17. The apparatus as recited in claim 14, wherein:
said lower end of said rod is in the form of an enlarged head and the remainder of said rod is in the form of an elongated stem having said head attached thereon, said head being of a larger diametric size than said stem of said rod;
said one contact is in the form of an annular ring of electrically conductive material surrounding and seated on said enlarged head of said rod;
said other contact is in the form of a threaded shank defined on said lower end of said ball member by which said ball member is mountable on a towing vehicle attachment plate; and
said resiliently flexible means is in the form of a band of stretchible material having an opening defined therein for receiving said shank of said ball member with portions of said band surrounding said opening capable of being attached to said ball member and said attachment plate on which said ball member is mountable, said band of material being stretched about said enlarged head of said rod at another portion thereof opposite said opening defined in said band.

* * * * *